United States Patent
Rublowsky et al.

(10) Patent No.: US 9,677,840 B2
(45) Date of Patent: Jun. 13, 2017

(54) AUGMENTED REALITY SIMULATOR

(71) Applicants: Stefan J. Rublowsky, Brooklyn, NY (US); Caleb Clark Crye, Brooklyn, NY (US)

(72) Inventors: Stefan J. Rublowsky, Brooklyn, NY (US); Caleb Clark Crye, Brooklyn, NY (US)

(73) Assignee: LINEWEIGHT LLC, Brooklyn, NY (US)

( * ) Notice: Subject to any disclaimer, the term of this patent is extended or adjusted under 35 U.S.C. 154(b) by 407 days.

(21) Appl. No.: 14/211,036

(22) Filed: Mar. 14, 2014

(65) Prior Publication Data
US 2015/0260474 A1    Sep. 17, 2015

(51) Int. Cl.
*G06F 17/00*    (2006.01)
*F41A 33/00*    (2006.01)
(Continued)

(52) U.S. Cl.
CPC ............ *F41A 33/00* (2013.01); *A63F 13/213* (2014.09); *A63F 13/26* (2014.09); *A63F 13/42* (2014.09);
(Continued)

(58) Field of Classification Search
CPC .......... A63F 13/42; A63F 13/65; A63F 13/26; A63F 13/213; A63F 13/837;
(Continued)

(56) References Cited

U.S. PATENT DOCUMENTS

| | | |
|---|---|---|
| 3,576,945 A | 5/1971 | Ebelling |
| 3,746,782 A | 7/1973 | Driskell |

(Continued)

FOREIGN PATENT DOCUMENTS

| | | |
|---|---|---|
| EP | 2568355 A2 | 3/2013 |
| WO | 0130079 A1 | 4/2001 |

(Continued)

OTHER PUBLICATIONS

International Search Report for PCT/US2015018367 dated May 8, 2015.

(Continued)

*Primary Examiner* — Nathan Hillery
(74) *Attorney, Agent, or Firm* — Stiennon & Stiennon

(57) ABSTRACT

An augmented reality system in which video imagery of a physical environment is combined with video images output by a game engine by the use of a traveling matte which identifies portions of the visible physical environment by techniques such as Computer vision or chroma keying and replaces them with the video images output by the video game engine. The composited imagery of the physical environment and the video game imagery is supplied to a trainee through a headmounted display screen. Additionally, peripheral vision is preserved either by providing complete binocular display to the limits of peripheral vision, or by providing a visual path to the peripheral vision which is matched in luminance to higher resolution augmented reality images provided by the binocular displays. A software/ hardware element comprised of a server control station and a controller onboard the trainee performs the modeling, scenario generation, communications, tracking, and metric generation.

6 Claims, 6 Drawing Sheets

(51) Int. Cl.

| | |
|---|---|
| *G06T 19/00* | (2011.01) |
| *G06F 3/01* | (2006.01) |
| *G09B 9/00* | (2006.01) |
| *G09G 3/20* | (2006.01) |
| *A63F 13/26* | (2014.01) |
| *A63F 13/837* | (2014.01) |
| *A63F 13/65* | (2014.01) |
| *A63F 13/213* | (2014.01) |
| *A63F 13/42* | (2014.01) |

(52) U.S. Cl.
CPC ............ *A63F 13/65* (2014.09); *A63F 13/837* (2014.09); *G06F 3/011* (2013.01); *G06T 19/006* (2013.01); *G09B 9/003* (2013.01); *G09G 3/2003* (2013.01); *G06T 2210/61* (2013.01); *G09G 2340/125* (2013.01)

(58) Field of Classification Search
CPC ... G06T 19/006; G06T 2210/61; G06F 3/011; G09B 9/003; G09G 3/2003; G09G 2340/125; F41A 33/00
See application file for complete search history.

(56) References Cited

U.S. PATENT DOCUMENTS

| | | |
|---|---|---|
| 4,246,605 A | 1/1981 | LaRussa |
| 4,283,177 A | 8/1981 | Kron et al. |
| 4,310,849 A | 1/1982 | Glass |
| 4,823,271 A | 4/1989 | Clark et al. |
| 4,884,219 A | 11/1989 | Waldren |
| 4,988,981 A | 1/1991 | Zimmerman et al. |
| 5,214,466 A | 5/1993 | Nagano et al. |
| 5,320,538 A | 6/1994 | Baum |
| 5,446,798 A | 8/1995 | Morita et al. |
| 5,491,510 A | 2/1996 | Gove |
| 5,581,629 A | 12/1996 | Hanna et al. |
| 5,588,139 A | 12/1996 | Lanier et al. |
| 5,699,444 A | 12/1997 | Palm |
| 5,850,352 A | 12/1998 | Moezzi et al. |
| 5,991,085 A | 11/1999 | Rallison et al. |
| 6,037,914 A | 3/2000 | Robinson |
| 6,046,712 A | 4/2000 | Beller et al. |
| 6,064,749 A | 5/2000 | Hirota et al. |
| 6,084,587 A | 7/2000 | Tarr et al. |
| 6,151,009 A | 11/2000 | Kanade et al. |
| 6,166,744 A | 12/2000 | Jaszlics et al. |
| 6,278,461 B1 | 8/2001 | Ellenby et al. |
| 6,307,556 B1 | 10/2001 | Ellenby et al. |
| 6,411,266 B1 | 6/2002 | Maguire, Jr. |
| 6,518,939 B1 | 2/2003 | Kikuchi |
| 6,549,641 B2 | 4/2003 | Ishikawa et al. |
| 6,570,566 B1 | 5/2003 | Yoshigahara |
| 6,570,581 B1 | 5/2003 | Smith |
| 6,597,818 B2 | 7/2003 | Kumar et al. |
| 6,968,084 B2 | 11/2005 | Satoh |
| 6,990,429 B2 | 1/2006 | Anabuki |
| 7,002,551 B2 | 2/2006 | Azuma et al. |
| 7,042,421 B2 | 5/2006 | Hobgood et al. |
| 7,050,078 B2 | 5/2006 | Dempski |
| 7,053,916 B2 | 5/2006 | Kobayashi et al. |
| 7,110,013 B2 | 9/2006 | Ebersole et al. |
| 7,113,618 B2 | 9/2006 | Junkins et al. |
| 7,248,232 B1 | 7/2007 | Yamazaki et al. |
| 7,259,758 B2 | 8/2007 | Yee |
| 7,301,547 B2 | 11/2007 | Martins et al. |
| 7,403,220 B2 | 7/2008 | MacIntosh et al. |
| 7,583,275 B2 | 9/2009 | Neumann et al. |
| 7,646,394 B1 | 1/2010 | Neely, III et al. |
| 7,683,565 B2 | 3/2010 | Quaid et al. |
| 7,742,062 B2 | 6/2010 | Oisel et al. |
| 7,796,155 B1 | 9/2010 | Neely, III et al. |
| 7,817,104 B2 | 10/2010 | Ryu et al. |
| 7,855,638 B2 | 12/2010 | Huston |
| 7,924,506 B2 | 4/2011 | Rieger |
| 7,929,730 B2 | 4/2011 | Huang et al. |
| 7,991,220 B2 | 8/2011 | Nagai et al. |
| 8,046,408 B2 | 10/2011 | Torabi |
| D649,550 S | 11/2011 | Segui Tomas et al. |
| 8,049,750 B2 | 11/2011 | Gloudemans et al. |
| 8,102,334 B2 | 1/2012 | Brown et al. |
| 8,160,302 B2 | 4/2012 | Wagg |
| 8,260,036 B2 | 9/2012 | Hamza et al. |
| 8,264,505 B2 | 9/2012 | Bathiche et al. |
| 8,315,432 B2 | 11/2012 | Lefevre et al. |
| 8,330,812 B2 | 12/2012 | Maguire, Jr. |
| 8,340,504 B2 | 12/2012 | Southworth |
| 8,344,863 B2 | 1/2013 | Choi et al. |
| 8,345,066 B2 | 1/2013 | Moritz |
| 8,345,952 B2 | 1/2013 | Tsujimoto et al. |
| 8,350,902 B2 | 1/2013 | Razzaque et al. |
| 8,355,532 B2 | 1/2013 | Gillard et al. |
| 8,384,668 B2 | 2/2013 | Barney et al. |
| 8,392,450 B2 | 3/2013 | Blanchflower et al. |
| 2002/0039085 A1* | 4/2002 | Ebersole ............... A62B 9/006 345/8 |
| 2004/0212630 A1* | 10/2004 | Hobgood ............... G06F 3/011 345/633 |
| 2005/0168403 A1* | 8/2005 | Ebersole ............... A62B 18/04 345/8 |
| 2005/0195279 A1* | 9/2005 | Hobgood ............... H04N 5/232 348/143 |
| 2007/0035561 A1* | 2/2007 | Bachelder ............ G06T 19/003 345/633 |
| 2007/0132785 A1* | 6/2007 | Ebersole ................ A63F 13/06 345/633 |
| 2007/0164988 A1* | 7/2007 | Ryu ........................ G06F 3/013 345/156 |
| 2007/0247457 A1* | 10/2007 | Gustafsson ............... F41G 1/00 345/420 |
| 2007/0273610 A1* | 11/2007 | Baillot .................. G02B 27/017 345/8 |
| 2008/0002262 A1* | 1/2008 | Chirieleison ...... G02B 27/0093 359/630 |
| 2008/0024597 A1* | 1/2008 | Yang ........................ A63F 13/02 348/53 |
| 2009/0046140 A1* | 2/2009 | Lashmet ................. G09G 3/002 348/51 |
| 2010/0225743 A1* | 9/2010 | Florencio ............. H04N 13/0014 348/46 |
| 2010/0253700 A1* | 10/2010 | Bergeron ................ G03B 35/00 345/633 |
| 2011/0084983 A1* | 4/2011 | Demaine ................. G06T 19/00 345/633 |
| 2012/0038739 A1* | 2/2012 | Welch ................. H04N 13/0488 348/14.01 |
| 2013/0117377 A1* | 5/2013 | Miller ..................... H04L 67/38 709/205 |
| 2013/0125027 A1* | 5/2013 | Abovitz .................. G06F 3/011 715/757 |
| 2013/0286004 A1* | 10/2013 | McCulloch ........... G06T 19/006 345/419 |

FOREIGN PATENT DOCUMENTS

| | | |
|---|---|---|
| WO | 02073287 A2 | 9/2002 |
| WO | 2004012141 A2 | 2/2004 |
| WO | 2005088539 A2 | 9/2005 |
| WO | 2007133209 A1 | 11/2007 |
| WO | 2012052979 A2 | 4/2012 |
| WO | 2013111145 A1 | 8/2013 |

OTHER PUBLICATIONS

Written Opinion of the International Searching Authority for PCT/US2015/018367 dated May 8, 2015.
Cave automatic virtual environment, http://en.wikipedia.org/wiki/Cave Automatic Virtual Environment, accessed Feb. 14, 2014.
Mixed reality, http://en.wikipedia.org/wiki/Mixed reality, accessed Feb. 14, 2014.

(56) References Cited

OTHER PUBLICATIONS

Slater, M. and Usoh, M., "Simulating Peripheral Vision in Immersive Virtual Environments," Computers and Graphics, vol. 17, Issue 6, pp. 643-655., Nov.-Dec. 1993, http://nautilus.fis.uc.pt/softc/Read_c/RV/Aplicacoes/20.htm, accessed Feb. 14, 2014.
Virtual Army Experience, http://en.wikipedia.org/wiki/Virtual_Army_Experience, accessed Feb. 14, 2014.
Retroist Forum, "Driving an Arcade Game for Real," www.forum.retroist.com/discussion/272/driving-an-arcade-game-for-real/p1, accessed Aug. 6, 2013.
The Engineer, "Defence and security," http://www.theengineer.co.uk/awards/defence-and-security/1005774.article, accessed Mar. 4, 2014.
U.S. Army PEO STRI, http://www.peostri.army.mil/PRODUCTS/USAGFTP/, accessed Mar. 4, 2013.
"Sandia National Laboratories: State of the art Augmented Reality military training system for close-quarters combat," http://www.electrictv.com/?p=7501, posted Aug. 2, 2011, accessed Mar. 4, 2014. Reverent portion: Entire document.
Ideas, Inventions and Innovations, "Is this Real or Just Fantasy? ONR Augmented-reality Initiative Progresses," http://www.ineffableisland.com/2012/08/is-this-real-or-just-fantasy-onr.html, accessed Mar. 4, 2014.
Rosman, Katherine "Augmented Reality Gains Traction." The Wall Street Journal, Mar. 4, 2014: In the screen capture from a video clip on http://online.wsj.com/news/articles/SB10001424052702304585004579417612087615766 a image of a package held in a consumers hand and imaged on ipad is augmented by a moving image located at the > in the screen shot.

* cited by examiner

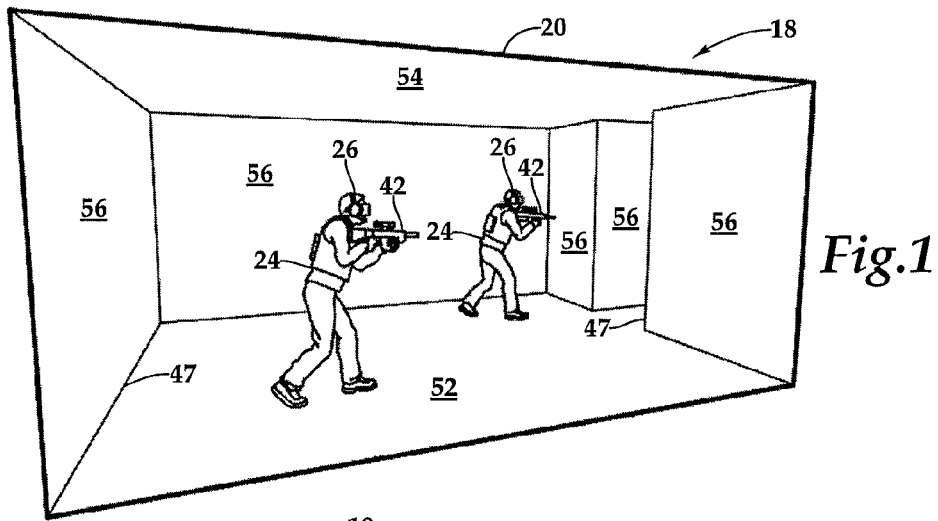

Fig.1

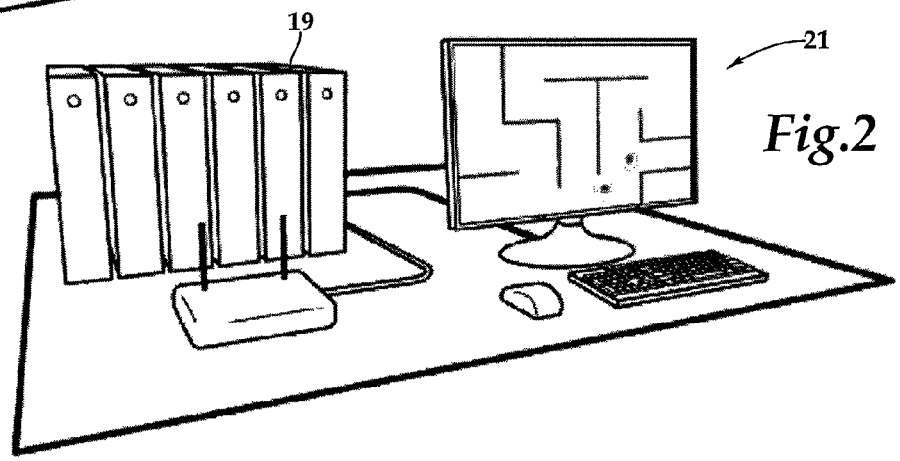

Fig.2

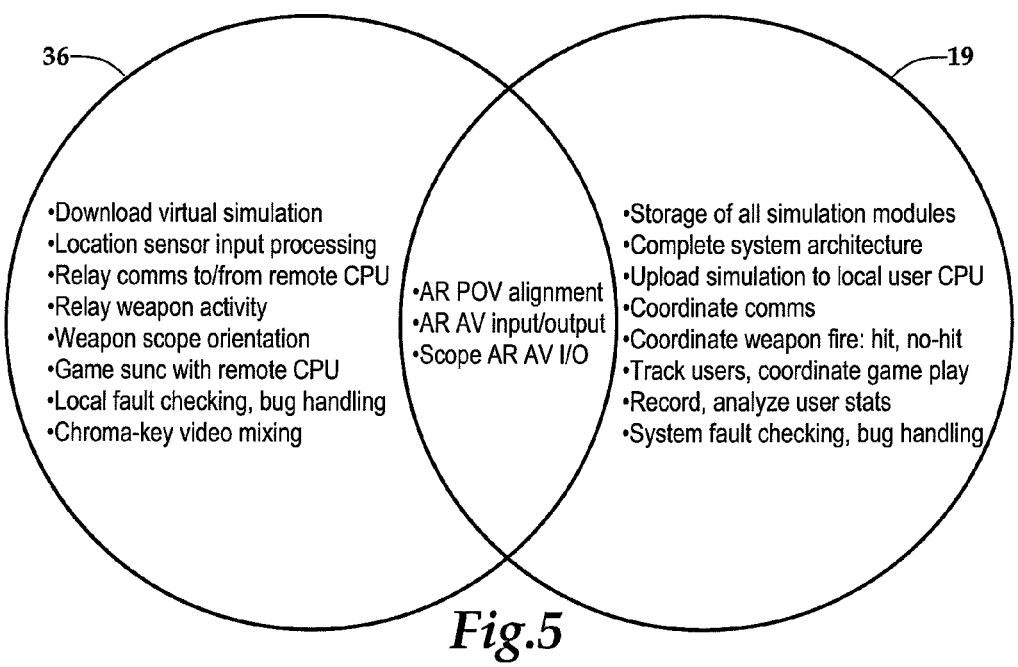

- Download virtual simulation
- Location sensor input processing
- Relay comms to/from remote CPU
- Relay weapon activity
- Weapon scope orientation
- Game sunc with remote CPU
- Local fault checking, bug handling
- Chroma-key video mixing

- AR POV alignment
- AR AV input/output
- Scope AR AV I/O

- Storage of all simulation modules
- Complete system architecture
- Upload simulation to local user CPU
- Coordinate comms
- Coordinate weapon fire: hit, no-hit
- Track users, coordinate game play
- Record, analyze user stats
- System fault checking, bug handling

Fig.5

AUGMENTED REALITY SIMULATOR

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to augmented reality systems in general and to those used for police, and fire training in particular.

With the advent of better graphic displays and faster computers, virtual reality and augmented reality have become an area of intense research with the expectation that substantial benefits can be derived from the ability to simulate or augment reality with computer-generated visual graphics. One such system is known as Cave Automatic Virtual Environment (CAVE) in which a large theater is situated within a larger room where the walls of the room or "cave" are made of rear projection screens and the floor is a down projection screen. A user of the virtual environment wears special glasses to see 3-D graphics on the walls and floor of the cave. Various software packages have been developed that make proprietary 3-D software or existing 3-D OpenGL applications interface with the CAVE environment.

Virtual reality systems have been adopted for use in training, for flight simulators, hazardous duty simulations, medic training, and vehicle simulation. The advantages of virtual reality for high-risk service providers is that interactive scenarios can be experienced without any personal danger and at lower cost than other types of simulation. Virtual reality training is conducted in which personnel are given virtual reality glasses using headmounted displays (HMD) which are worn to create a three-dimensional visual illusion of seeing a particular place or field of action which can be simultaneously viewed by a group of participants.

Augmented reality may consist of projecting additional information on a real world scene by combining computer-generated graphics with what a person perceives by eye. An example of this is Google Glass, which is a wearable computer with an optical head-mounted display (OHMD) developed by Google. Google Glass communicates by Bluetooth with a smartphone to display information or take movies or pictures which are seen as semitransparent images projected in front of the wearer.

More typically augmented reality is live, direct or indirect, viewing of a physical real scene which is supplemented, diminished or mediated by computer-generated graphics or other sensory input. The information may relate to the reality perceived or may be more generally informational such as the time, the location, the weather, or any other information generally accessible by the Web.

Mixed reality (MR) was defined in 1994 by Paul Milgram and Fumio Kishino as " . . . Anywhere between the extrema of the virtual reality continuum" where the continuum extends from the completely real to the completely virtual environment, with augmented reality and augmented virtual reality on the continuum between the extrema.

One example of mixed reality is a mobile simulator which allows visitors to the mobile simulator to experience a popular computer game in a life-sized networked environment. Inside the mobile simulator visitors participate in an eight-minute-long virtual mission projected onscreen in front of the participants in which they fire at virtual humans and vehicle targets using life-size, recoil action air rifles from inside life-size helicopters or vehicle simulators, as members of a team on a mission.

Real simulators sometimes referred to as a Hogan's Alley involve the construction of a building or even, in the case of the FBI Academy, of a small town, in which various scenarios related to law enforcement missions can be simulated. Within the physical confines of the specially constructed buildings simulated threat situations are enacted. A Hogan's Alley training facility may use live ammunition with various pop-out targets. Alternatively, Hogan's Alley training may employ simulated weapons and actors to train personnel in quick and efficacious responses in high stress confrontational and violent scenarios.

A number of video games for entertainment or for training purposes have been developed based around the concept of a Hogan's Alley training facility where the entire exercise is conducted through interaction with a video screen, although in some cases the weapons used may be real models of weapons which are held by the user.

Each type of training simulator, whether a videogame or a physical Hogan's Alley training facility, has various limitations. The video games may be readily programmed to provide a broad selection of scenarios and difficulty level, but lack the level of stress and physical training achieved by a Hogan's Alley training facility. On the other hand, a physical Hogan's Alley facility, while providing a realistic and physically engaging simulation, lacks the flexibility and cost-effectiveness of the videogame environment. Virtual reality and augmented reality systems all attempt to combine some features of both systems but continue to lack the smooth integration of the physical Hogan's Alley environment with the flexibility of computer-generated images, sound, and scenario which are responsive to the trainees' actions.

SUMMARY OF THE INVENTION

To provide augmented reality to a trainee acting out a scenario within a real or physical environment, three elements in addition to the real environment are needed: First, there must be a headset worn on the trainee's head having a digital headmounted display which provides low latency images (a binocular video feed) to the trainee from cameras mounted on the headset. Second, a videogame engine is required which provides video game imagery with which the images from the cameras mounted on the headset are augmented. Third, a technique is required for compositing the video game imagery with the images from the cameras mounted on the headset to produce the augmented reality provided to the trainee on the display. Additionally, to enhance safety, real, simulated, or captured peripheral vision can be combined with the stereoscopic (binocular) video feed such that the lower brain functions, i.e., autonomic brain functions, integrate tactile information from the feet with peripheral vision and thus prevent tripping over stairs or other objects.

The binocular video feed if provided to the headmounted display with minimal latency, will like night vision goggles, provide no problem for the trainee with vertigo or lack of verisimilitude.

The videogame imagery which is used to augment the binocular video feed from the cameras on the headset must be aligned with the real environment and provided with low latency. A CAD model which corresponds with the real environment in which the training scenarios are played out is aligned such that a video feed is created which corresponds to the binocular video feed from the headset cameras. This alignment is carried out by positional tracking of the headset and the binocular cameras mounted thereto. Positional tracking of the headset uses one or preferably all three of the following techniques: first position tracking cameras on the headset which are oriented to view and which track markers on the ceiling or other surfaces of the physical environment to determine the position and orientation of the headset and the cameras mounted on the headset; second an inertial platform on the headset; and third, matching between the video feed and a computer model of the physical environment (machine vision techniques).

The trainee is also equipped with an onboard processor which receives and processes the binocular video feed, and communicates with an external server by a wireless link. The onboard processor minimizes latency and communication bandwidth requirements, while the server provides processing power, scenario development, and recording of performance metrics.

The onboard processor includes a video processor which aligns the CAD model with the binocular video feed and creates a traveling matte using machine vision techniques to compare the CAD model with the binocular video feed and to identify objects in the video feed which are not in the CAD model.

The video processor then takes the CAD model on which the video imagery has been written, either on the onboard processor or on the exterior server, and creates a virtual video feed which contains only the video imagery as projected on the CAD model from which is subtracted a traveling matte (or mask) corresponding to the objects in the video feed which are not in the CAD model.

The virtual video feed is then used at the pixel level to overwrite the binocular video feed, producing a composited image of the binocular video feed and the virtual imagery which is applied to the trainee's headmounted digital display.

The result is that the video game imagery is aligned with the real environment but does not overwrite those portions of the real environment (e.g., other trainees or equipment) which are not part of the CAD model.

In addition to interacting with the physical reality by moving through and touching the physical objects, the trainee carries one or more weapons or tools e.g, fire fighting equipment, which are real physical objects which may be seen as they are imaged by the stereoscopic video from the headset or augmented by the computer-generated images to change their appearance as perceived by the trainee. The weapon(s) incorporate physical actuation and feedback, simulating the action of a real weapon and providing a means for identifying the weapon's effects on the augmented reality presented to the trainee. For example, a laser beam is emitted by a gun when the trigger is pulled and the video processing may identify the hit point of the laser by brightness, coherence or wavelength of the laser light.

The external server stores simulation models and tools which are used to design a particular scenario which is downloaded to the onboard processor. The scenario includes the virtual objects to be displayed which make up the videogame imagery, which may be time-dependent so that the scenario has an interactive time-line during which the augmented reality, visual, audio or tactile, is generated. Movement along the time-line can be mapped to the movements of the trainee as well as the time that has elapsed since the beginning of the training scenario. The external server also archives video feeds, metrics and other data generated during a scenario, either obtained directly over the wireless feed, or downloaded from the onboard processor after completion of the scenario. The external server provides scoring, debriefing aids, progress reports and analysis, as well as the data processing for elucidating correlations between data fields, between trainees, a single trainee over time, and between related or unrelated scenarios.

The headset includes two-way or multi-way communications which is run through the wireless link. The two-way or multi-way communications may be with other persons participating in the scenario, whether within the physical structure or outside the physical structure or with a scenario director.

It is an object of the present invention to provide a cost-effective adaptive augmented reality environment for training.

It is a further object of the present invention to provide a gaming environment of increased sophistication and reality.

It is a further object of the present invention to provide a simulation of an aircraft, ship or vehicle at reduced cost.

It is a further object of the present invention to provide team and command training in life hazardous scenarios without significant risk to the trainees.

It is further object of the present invention to provide a research tool for the development of better tactics and inter team interactions in life hazardous scenarios, such as law enforcement, firefighting, and emergency response.

Further objects, features and advantages of the invention will be apparent from the following detailed description when taken in conjunction with the accompanying drawings.

BRIEF DESCRIPTION OF THE DRAWINGS

FIG. 1 is a schematic perspective view of the physical environment in which augmented reality scenarios are enacted.

FIG. 2. is a schematic view of an external server and workstation for augmented reality scenarios selection or design, and wherein the augmented reality scenarios can be monitored and directed.

FIG. 5 is a schematic representation of the division of functions between the onboard processor and the remote central processor.

DESCRIPTION OF THE PREFERRED EMBODIMENTS

Figure 3A:
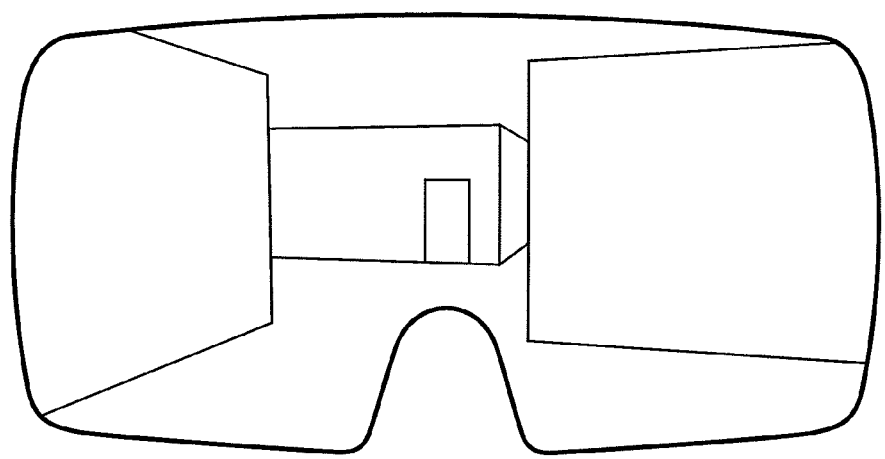
FIG. 3A is a schematic view of a CAD model of a physical environment corresponding to a binocular display in the headset.
Figure 3B:
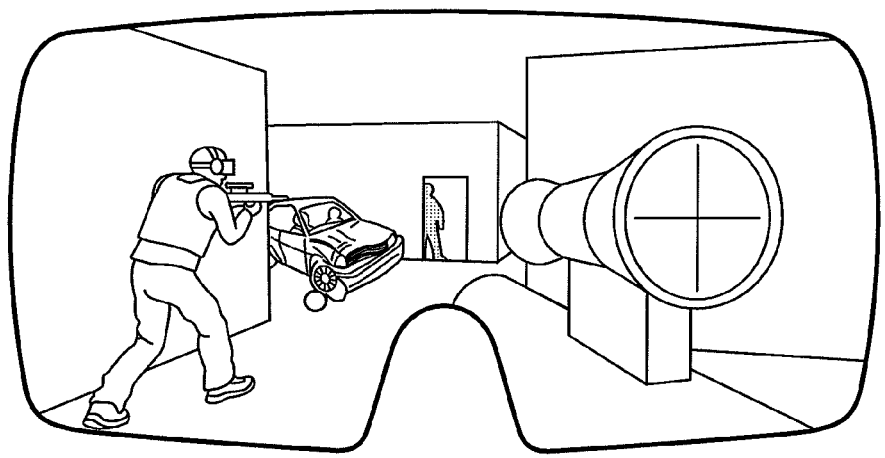
FIG. 3B is a schematic view through the headset binocular display before augmentation with video game imagery.
Figure 3C:
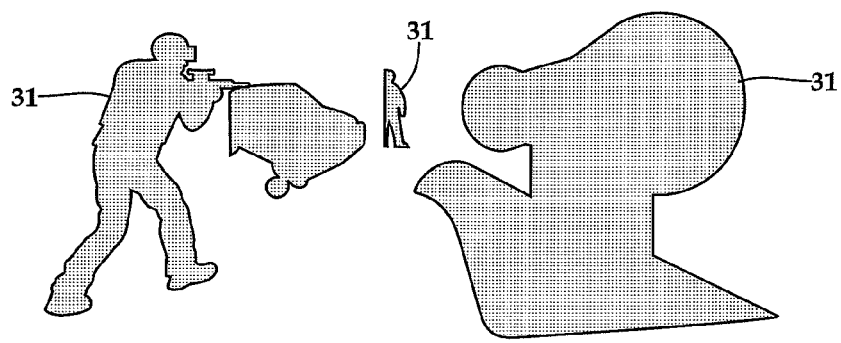
FIG. 3C is a schematic view of the subtraction of the view of FIG. 3A from the view of FIG. 3B.

Referring more particularly to FIGS. 1-8B wherein like numbers refer to similar parts, an augmented reality system 18 is shown in FIG. 1 and comprises the real physical environment 20 which will generally have an areal extent of 40 ft.$^2$ to several thousand square feet or more. The physical environment 20 contains natural or artificial structures which form a set like a stage on which trainees may physically move—walking or running and moving through and around the structures to conduct training exercises.

In addition to a real physical environment 20 in which training scenarios are conducted, the augmented reality system 18 includes four major systems:

1. A headmounted display 30, shown in FIG. 4, which provides low latency images from binocular cameras 28 mounted with the display to a headset 27, which is worn by a trainee 24.
2. A position tracking system, which uses one or more position tracking camera(s) 25 on the headset 27 which track markers 29 on the ceiling 54, floor 52, or walls 56 of the physical environment 20 to determine the position and orientation of the headset and the binocular cameras mounted 28 on the headset. In addition, the position tracking system utilizes an inertial platform (not shown) on the headset, and matching between a video feed from the binocular cameras 28 and a computer model of the physical environment.
3. A videogame engine which provides video game imagery 50 as shown in FIGS. 3D, 3E, and 3F which augments the reality viewed by the binocular cameras 28 mounted on the headset 27 and which is displayed by the headmounted display 30.
4. A technique for compositing the videogame imagery and the imagery from the headmounted cameras to produce the augmented reality provided to the trainee on the display.

Figure 4:
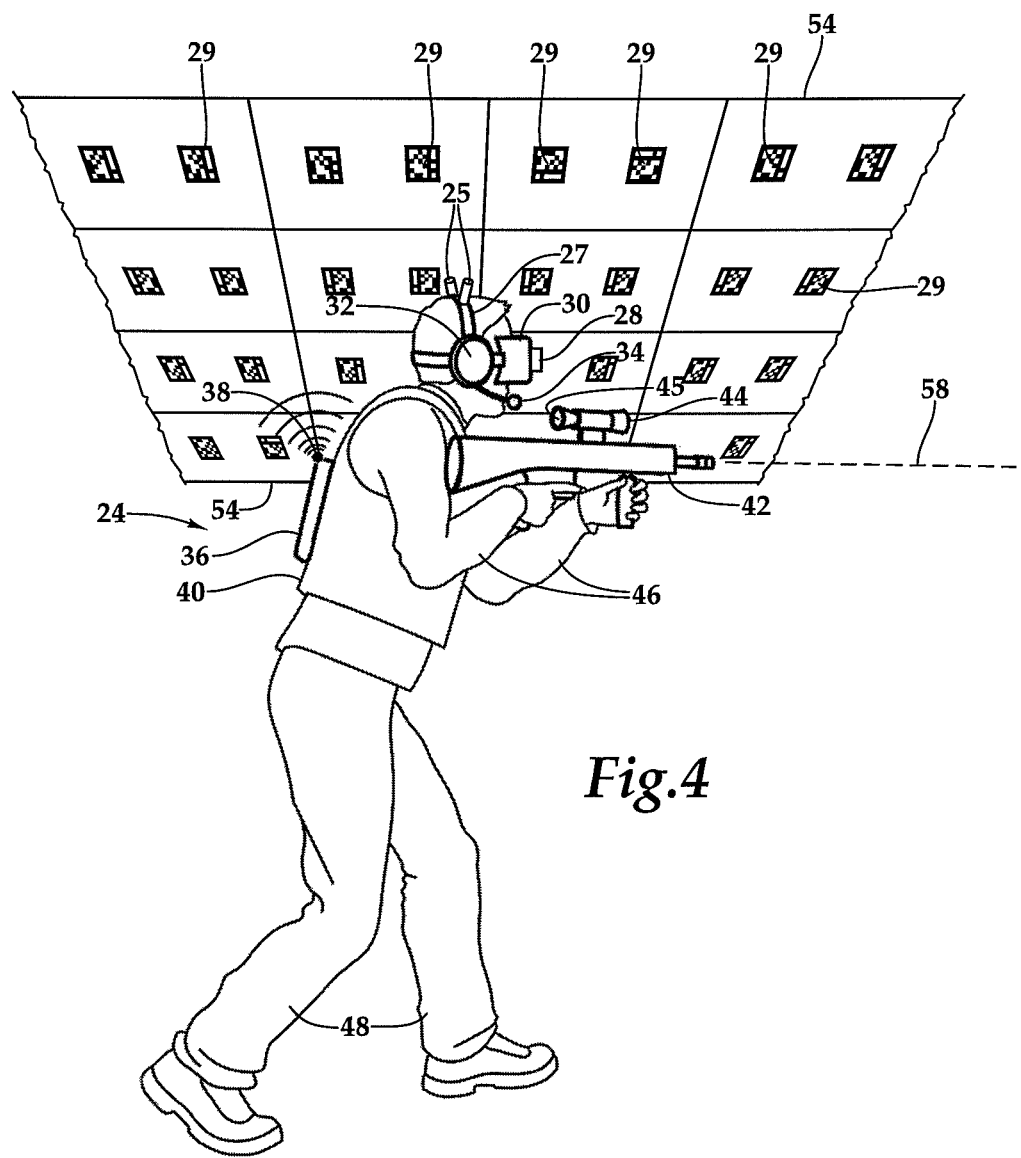
FIG. 4 is a perspective view of a trainee and his model weapon showing the headset incorporating scene viewing binoculars cameras, binocular position tracking cameras, headmounted display, voice pickup, onboard processor, and communication links positioned beneath an overhead marked surface.
Figure 6:
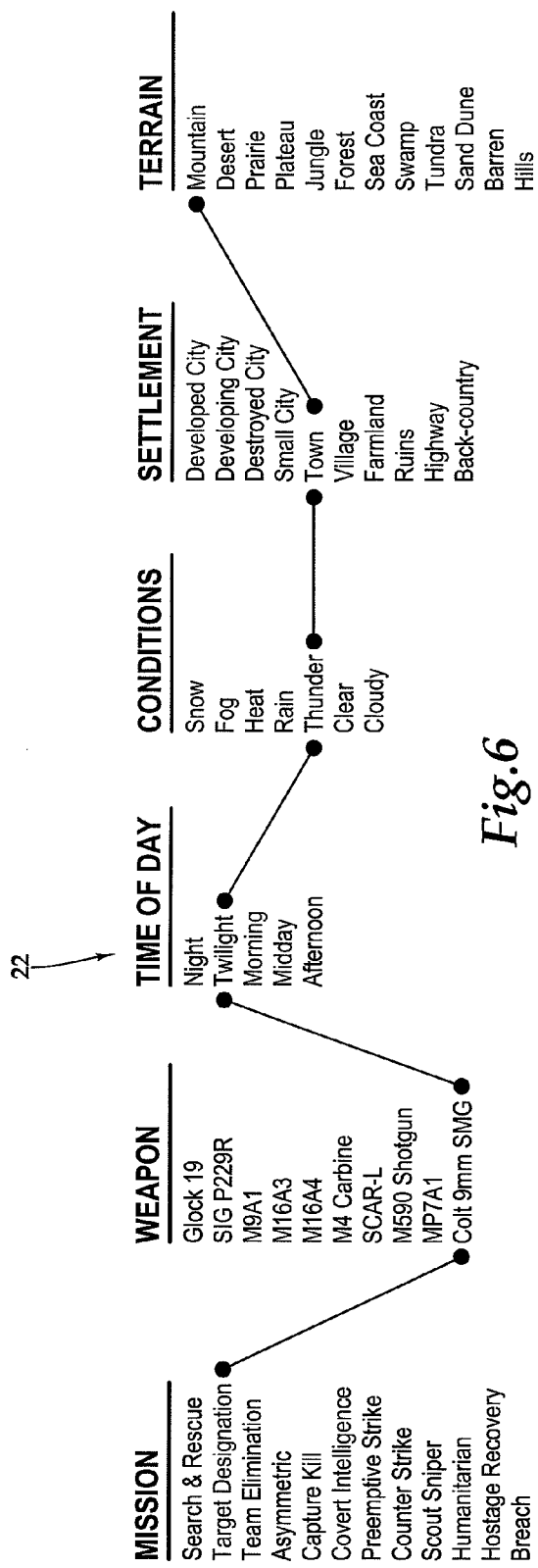
FIG. 6. is a schematic representation of the scenario selection/design menu hosted by the central processor.

The augmented reality system 18, as shown in FIG. 1, has a software/hardware element comprised of a server 19, control station 21, shown in FIG. 2, and an onboard processor 36, shown in FIG. 4. A selected augmented reality scenario 22 of the type shown in FIG. 6 is experienced through the interaction of the physical environment 20, the headset 27, and the software/hardware element, with one or more trainees 24, i.e., persons.

A trainee 24, as shown in FIG. 4, is equipped with the headset 27 which combines binocular cameras 28 mounted in front of a binocular display 30. Positional tracking of the headset is provided by two binocular vertical cameras 25 which track orientation marks 29 formed by indicia on the ceiling 54 and/or other parts of the physical environment 20. The headset 27 also includes stereo earphones 32 as well as a communication microphone 34. Ambient sound microphones (not shown) can be positioned on the exterior of the earphones 32. An onboard processor 36 and a communication system 38 form a functional part of the headset 27. These subsystems are illustrated in FIG. 4 mounted to the back 40 of the trainee 24 and connected to the headset 27 wirelessly or through a hard communication link. However, all subsystems including onboard processing 36 and communications 38 may be totally physically incorporated within the headset 27, thereby minimizing the amount of additional gear which must be integrated with standard combat equipment should the scenario be enacted by a fully combat equipped trainee.

The positional tracking provided by the two binocular vertical cameras 25 tracks orientation marks 29 on the ceiling 54 of the physical environment 20. The tracking marks, are indicia such as BCH encoded markers 29, which provide alignment marks which incorporate as part of the tracking mark a key (or numbering system) indicating unique positions on the ceiling. BCH encoded markers incorporate binary codes that can correct multiple bit errors and are easily decoded via an algebraic method known as syndrome decoding which allows small low-power electronic hardware. Other codes, for example Quick Response Code (QR) markings or simple alignment marks can also be used. The tracking marks 29 provide orientation and position of the headset 27 which are linked to corresponding marks, or tracking coordinates, in the CAD Model of the physical environment 20.

The inertial platform includes acceleration and rate sensors which output data which are processed to provide linear and angular velocities and position. These sensors are subject to drift, which is overcome with the binocular tracking cameras 25. Inertial sensors and their use in headsets are state of the art, for example the SEN-10724 nine degrees of freedom sensor (three gyros, three accelerometers, three magnetometers) such as available from suppliers such as SparkFun Electronics of Boulder, Colo. Position tracking of the headset 27 is overdetermined, using the inertial sensors, the vertical binocular tracking cameras 25, and is also provided from the binocular video feed 28 which can determine the position of the headset by matching portions of the video feed imagery with the known geometry of the physical environment 20 via the CAD model, using, for example, edge determining software.

Computer vision/image recognition is a well-developed art which has developed many techniques for object recognition. A partial list includes model-based approaches using CAD-like object models and employing edge detection, and edge matching such as the Canny edge detection. Other approaches use eigenvectors of templates (eigenfaces), Divide-and-Conquer searches, greyscale matching, Gradient matching, and histograms of receptive field responses. Opens source software such as Open CV provides over 2,500 algorithms, extensive documentation and sample code for real-time computer vision. Commercial packages are also available. The physical environment may be augmented to define the edges of surfaces which will be replaced in the binocular display with computer graphics, for example by color coding whole surfaces or their edges or labeling discrete surfaces with codes such as OR codes, or mounting infrared LEDs which actively (i.e., by flashing) or passively (remaining always on) mark edges or surfaces. Such marking simplifies aligning the CAD model with the video feeds 62, 64 on the binocular cameras 28, reducing computational power requirements and/or latency.

The three components of the position tracking system: headset cameras 25 tracking landmarks 29, inertial sensors, and the output of the binocular cameras 28, are complementary and work together. Drift in the inertial platform can be corrected using the tracking cameras 25 and the tracking landmarks 29, or with the binocular cameras 28 based on any misalignment of the camera output images and the CAD model. The inertial platform output can be at a high refresh rate to implement the low latency of the frame rate needed by the binocular display 30 for a good user experience, while the position tracking system can have a lower refresh rate.

The trainee 24 will also carry one or more weapon simulators such as the rifle 42 shown in FIG. 4. The rifle 42 includes a laser designator which is activated when the trigger is pulled, as well as a mechanical or pneumatic recoil simulator to provide realistic simulation of the action of firing the rifle. Additional sensors on the rifle 42 provide an output of the trigger pull, and other weapons subsystems such as safeties and magazine present indicators, which are used to measure metrics associated with weapon use, e.g., proper weapon operation, e.g. bolt retraction and release, disengagement of safeties, proper trigger pull, magazine insertion, etc. Rifle orientation is taken from the binocular video feed in combination with the known position of the headset 27. In addition, rifle orientation may be taken from an inertial platform on the gun, either a 3-, 6- or 9-axis inertial platform or a simple acceleration sensor used to determine the weapon's orientation with respect to gravity. The weapon may contain a functional optical sight 44 which is viewed through the binocular video feed with augmented images from the onboard processor 36 or the server 19. Alternatively, a non-functional optical sight 44 may be employed with all functionality provided by augmented reality provided by the processor 36 or the server 19. Other weapons systems, for example a bayonet or grenades, either rifle propelled or hand thrown, can be utilized by determination of the weapon's location and motion by onboard sensors and/or the binocular video feed, with the weapon's effect visual/audio being provided by the processor 36 and/or the server 19. The weapon simulators can communicate with the processor 36 simply through processing of the binocular video feeds, thus allowing the weapon to be a simple mechanical simulator with few or no onboard sensors, or can contain sensors which communicate directly with the processor 36. A laser beam 58, when activated by a trigger pull of the rife 42, is identified in the binocular video feeds if the impact of the laser is visible to the binocular cameras 28 or by optional set cameras (not shown) which view the entire physical environment 20. Rifle position can be determined by comparing the visual appearance of the rifle 42 with the known physical position of the headset 27 with the onboard inertial platform. The muzzle of a rifle can be keyed, for example by an infrared diode. In this way the general pointing direction of the rifle can be known, facilitating identification of the laser spot if it falls on a surface which may partly hide the laser impact point.

Figure 3D:
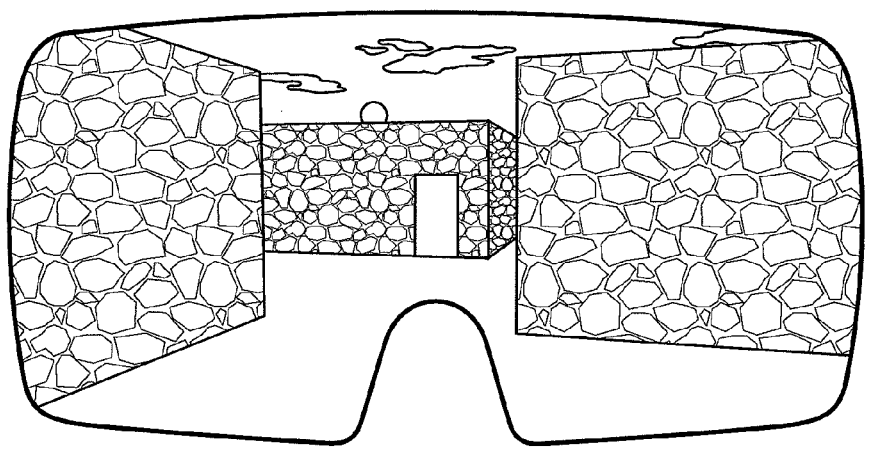
FIG. 3D is a schematic view of a CAD model of a physical environment corresponding to the physical environment of FIG. 3A which is to be augmented by video game imagery.
Figure 3E:
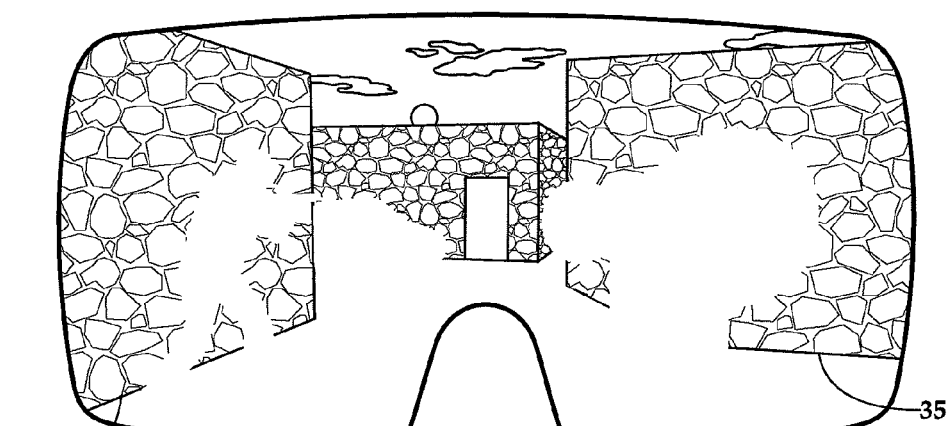
FIG. 3E is a schematic view of a CAD model corresponding to the physical environment of 3A augmented by the video game imagery of FIG. 3*d* with the objects of FIG. 3C subtracted.
Figure 3F:
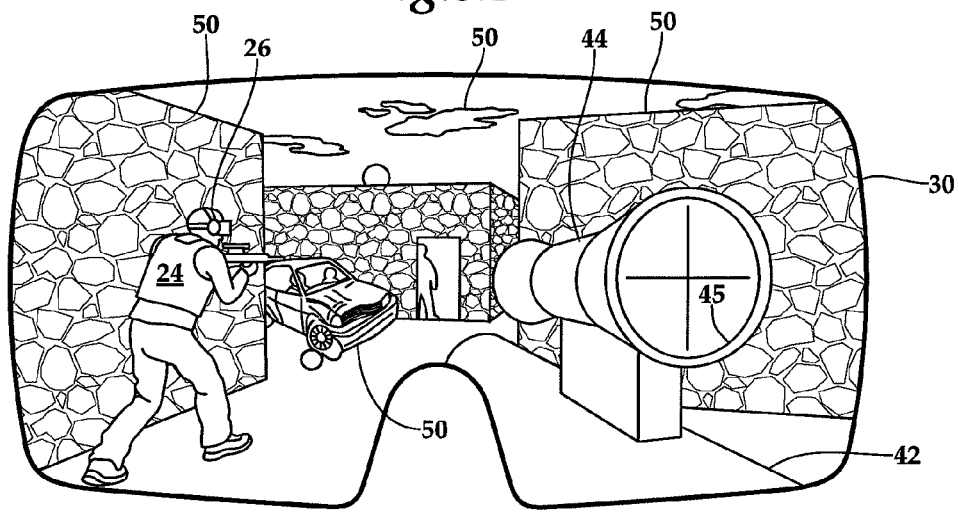
FIG. 3F is a schematic view of the physical environment corresponding to the binocular display in the headset of FIG. 3A augmented by the video game imagery of FIG. 3E.

The combination of video game imagery with the imagery of the physical environment 20 produced by the binocular cameras 28 involves the steps illustrated in FIGS. 3A-3F. As shown in FIG. 3A, a CAD model of the physical environment 20 is created and viewed, i.e., clipped (binocularly) from the same point of view as the binocular cameras 28 on the headset 27 shown in FIG. 3B. The CAD model view is subtracted from the binocular camera 28 view using machine vision techniques to identify the outlines of objects which are in the binocular camera view but not in the CAD model of the physical environment 20. The identified outlines of the objects are filled in to create a real-time binocular traveling matte 31 shown in FIG. 3C. In FIG. 3D portions of the CAD model are identified as fill surfaces, each fill surface is linked to a static or dynamic game graphic which fills those portions of surfaces in the CAD model which have been virtualized according to a time line or other metric such as the scenario selection made in FIG. 6.

The real-time binocular traveling matte 31 is subtracted from a view of the model filled with the video graphic images, and matching the view of the binocular cameras 28, shown in FIG. 3D, to create a binocular video feed (images) 35, which contains video graphic images, which are then composited with the video feeds from the binocular cameras 28. Compositing the binocular video graphic images video feed 35 replaces, on a pixel for pixel basis, the parts of the physical reality imaged in FIG. 3B to create the final augmented reality presented to the trainee on the binocular display 30 as shown in FIG. 3F.

Figure 7:
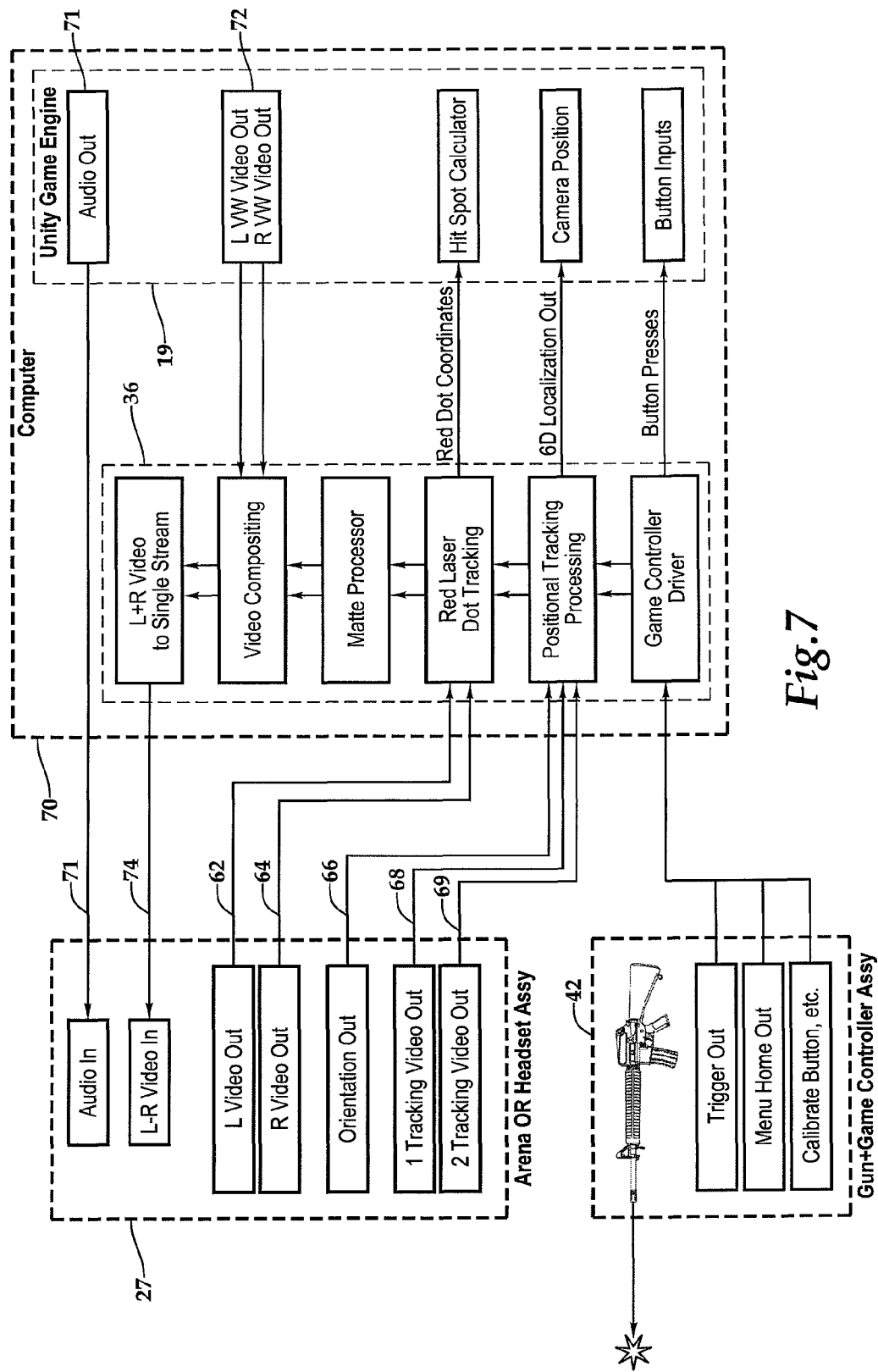
FIG. 7 is block diagram of the communication links and functional components of the augmented reality system of this invention.

To create the binocular traveling matte 31 it is necessary to identify the pixels within the imagery of the physical environment 20 produced by the binocular cameras 28 i.e., within the outputs 62, 64 shown in FIG. 7, that correspond to the people and things positioned or moving in the physical environment which are not in the CAD model. There are other approaches to accomplishing this other than the one illustrated in FIGS. 3A-3F. These other approaches include any technique for producing a signal which indicates whether a pixel is part of the traveling matte or is not. For example, the physical environment could be marked with a grid of infrared diodes which are used to identify the outlines of the people and stationary objects not in the CAD model. In another approach the moving people are recognized by their movement against the background and tracked from frame to frame, and stationary objects can be recognized as not corresponding to the CAD model by preprocessing to add these to the CAD model using 3D scanner such as a Kinect scanner available from LMI Technologies Inc. of Delta British Columbia, Canada or by a human operator adding them to the model.

The traveling matte 31 can also be produced by identifying within imagery of the physical environment 20 produced by the binocular cameras 28 those portions of surfaces in the CAD model which have been virtualized, i.e. to which game imagery is applied, and which are visible to the binocular cameras 28. This involves producing a signal which can be taken to the pixel level which identifies the traveling matte 31.

In order to produce such a signal, the surfaces e.g., surfaces 56, 54, and 52 shown in FIG. 1, to which game imagery is applied may be encoded with properties which are then blocked by the people or things which are between the headset binocular cameras' fields of view and the surfaces to which game imagery is applied in the CAD model. Such encoding of the pixels can be properties of color (including ultraviolet and infrared), luminance, polarization (circular or planer), a time varying signal, a code such as a QR, or some combination of these properties. Encoding can employ a paint with a selected spectrum or combination of spectra which emits light which is reflected or emitted by the surface. Narrow band fluorescence, e.g., in the infrared, could also be used. Retroreflective glass beads or prismatic reflectors imbedded in the paint which are driven with a infrared light co-aligned with the binocular cameras 28 could also be used. The ideal technique will provide a signal from the surfaces which can be detected with low and uneven lighting, using an active, passive, or digital filter, in software or hardware, at the system level or on a chip forming the sensor used in the cameras 28. Chroma keying is a specific technology developed for cinematography which performs this function by replacing only pixels within the headset video feed with a particular luminance and color with the videogame imagery.

Using chroma keying is one approach to solving the problem of identifying the physical structures 47 and trainees in the physical environment 20, and differentiating the trainee's appendages, including the trainee's arms 46 and legs 48, and weapon systems 42 so that the reality augmentation images 50, which are added to the images of the physical environment 20 in the binocular display 30, are not applied to any part of the image of the trainee or the weapons systems he carries with him. Other actors/trainees, and other objects which are not to be overlain with augmented reality images are also distinguished by not being chroma keyed. Chroma keying is accomplished by coloring the physical environment with one or more selected colors which are evenly illuminated. The chroma key coloring consists of specific colors applied to different surfaces of the physical environment 20. A single color such as used in blue or green screening in cinematography can be used for parts or for the entire physical environment. To reduce processing power requirements, each distinct surface, such as the floor 52, the ceiling 54, each individual wall 56, and particular objects or structures, such as stairs, doors, vehicles, trees, rocks can be marked with the difference hues of color or with water marks, e.g., Quick Response Code™ (QR code), which encode identification of particular surfaces or objects, or parts of the same, such as edges. Chroma keying can be in several optical layers such as in the visible and the infrared or ultraviolet so that the water marks (QR code) or other information, e.g., surface edges, can be more easily extracted in the image processing of the binocular video feed 62, 64.

The weapon 42 or other tools can also be chroma keyed, or otherwise keyed e.g., by infrared diodes, so that all or part of the weapon 42 or tools can be augmented. In this way the eyepiece of the scope 44 can be augmented to simulate an optical sight, and the weapon 44 can be equipped with a video feed to supply the processor 36 or server 19 with the imagery from which a telescopic sight view can be built, and supplied as augmented reality to the chroma keyed eyepiece 45.

Figure 8B:
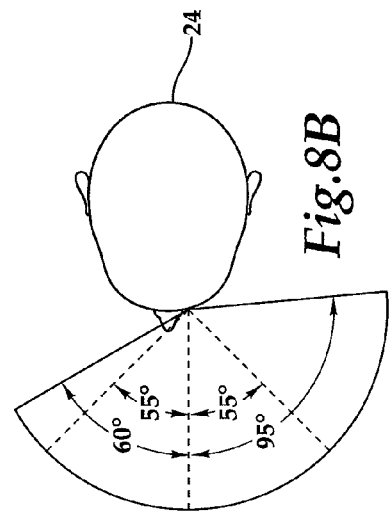
FIG. 8B is a schematic view of the horizontal visual field of a person's left eye.
Figure 8A:
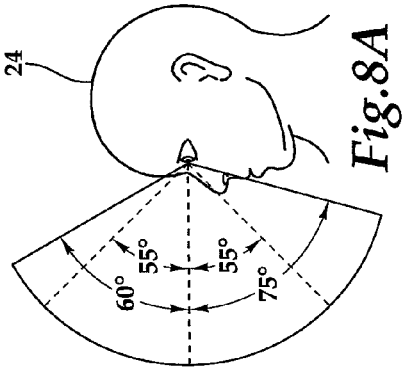
FIG. 8A is schematic view of the vertical visual field of a person.

In order for the trainee to move smoothly and confidently through the physical environment 20, the lower brain functions, i.e., the autonomic brain functions, must be able to integrate tactile information from the feet with peripheral vision to allow sure and unconscious placement of the feet to avoid stumbling or tripping as the trainee moves through the physical environment. This can be accomplished by the binocular display 30 if sufficient field of view, resolution and minimal latency is available both in the display and the video feeds 62, 64, from the binocular cameras 28, and positional tracking is sufficiently accurate. If these conditions are not met the binocular display 30 must provide or be combined with a peripheral image which provides peripheral vision. The normal human visual field extends −95° to −100° to either side for a total horizontal field of 190-200 degrees and approximately 135 degrees in the vertical plane, 60° above and 75° below the horizontal meridian as shown in FIGS. 8A and 8B. The central part of the human vision corresponds to our foveal vision or the central 2-3 degrees of vision which can resolve over 100 dots per inch at arm's length. Just outside of this central 2-3 degrees, a person can resolve only a few dozen dots per inch viewed at arm's length. At the edges of our peripheral vision we can resolve only visual objects as large as a human head at arm's length. The typical use of the peripheral vision is to alert our brains where to move the eyes to see something in detail with the central foveal vision. Peripheral vision also provides situational awareness to our brain by providing indications of movement in the peripheral vision.

The binocular display 30, typically located only a few, e.g., 3, centimeters, from the surface of each eye, has a field of view corresponding to the foveal vision i.e., 2-3° wide, of only about 1-2 mm at 3 cm. Without tracking of eyeball movement, however, full foveal resolution must be available for the full oculomotor range (OMR) of about plus or minus 55° or a total of 110° which amounts to about 6 cm for a display located 3 cm from the eye. Total horizontal peripheral vision of each eye corresponds to approximately 160°, 100° degrees to the side and 60° towards the nose. Vertical peripheral vision corresponds to about 135°, 60° above, and 75° below the horizontal. A wearer of glasses, particularly bifocal or progressive lenses has substantial distortion towards the limits of oculomotor side to side movement of the eyes due to lens distortion, but people do not normally notice this distortion, indicating that large movements of the eye may not require support by high resolution on the binocular display 30. It is also thought that awareness of peripheral vision provides a psychological effect in which the mind is more relaxed as it takes in the whole surrounding panorama, as compared to foveal vision which is linked to the sympathetic nervous system associated with activity, adrenalin and stress. Thus peripheral vision in addition to providing situational awareness may reduce stress.

The binocular cameras 28 are fixed to the headset 27 and thus to the trainee's head to rotate with the trainee's head as it turns or tilts to view objects. However, much more frequent is the movement of the eyes, which is typically subconscious and triggered by peripheral vision which the brain processes to identify parts of the visual field which the eyes than engage with the higher resolution narrow focused foveal vision. Therefore the binocular cameras 28 and the video feeds 62, 64 which they produce must be designed or selected so that the video feeds provide foveal visual acuity for an angular range corresponding to the range of eye movement capability which is of plus or minus 55° in the vertical and horizontal planes. However to incorporate peripheral vision, the video feeds 74 must provide lower resolution visual acuity to the full extent of peripheral vision of 95-100° to the side and 60° above and 70° below the horizontal. The binocular display 30 must make information from the video feed available to the trainee over the same ranges with respect to the foveal visual range and the peripheral visual range, or at least over ranges which are empirically determined to provide the level of vision which provides a realistic simulation of normal vision. Alternatively, the video feed may provide only the foveal vision and the peripheral vision may be provided by the trainee looking through clear or smart glass, with necessary adjustments in the video imagery and the smart glass to provide a smooth visual transition to the real peripheral vision. This clear optical path provided for peripheral vision may be modulated to integrate smoothly with the binocular display 30 by the use of electrically controlled smart glass i.e., glass which can be darkened by application of an electrical/static/magnetic field, which provides brightness matching with the display 30.

The use of the augmented reality system 18 begins with the design of the scenario which may be conducted through a software interface such as illustrated in FIG. 6. A standard mission is selected and the weapons, time of day, conditions, settlement, and terrain for the mission are selected. From this the computer program generates a mission timer or events line, with mission briefing, mission script, and mission voice commands. The trainee selects the weapons, tools, and other equipment (clothing, backpacks), which may be physically real or mockup equipment which may be used as is or reality augmented. Like a videogame game level, game imagery is selected based on the scenario specific time of day, conditions, settlement, and terrain, to fill the traveling mattes of the physical environment 20, i.e. the surfaces and objects of the physical environment which have been designated by the keying technique. Pre-mission briefing is then generated and presented to the trainee directly by a person or remotely or by a computer-generated command voice. The server 19 which contains the 3-D CAD model of the physical environment 20 can also be used to simulate the entire training exercise providing a full simulation of all activity in the arena, for pre-mission briefing, or use in real-time by the supervisor. The server 19 can also record an entire training scenario, including all video feeds and sensor data for later replay and/or review.

Once the design of the scenario and pre-mission briefing are completed the trainee(s) 24 proceed to the physical environment 20 as shown in FIG. 1. The trainee(s) 24 don the headset 27, the onboard processor 36, and the communication system 38. The trainee(s) then begin communication link checks, and operational checks of the headset, e.g. hearing, speaking, tracking and positioning sensors, the binocular display 30, and weapon system 42 functionality, and, with uploading of the training scenario to the onboard processor 36, the training scenario begins. Following any final pre-mission briefing instructions, the trainee(s) begin to move through the training exercise within the augmented virtual reality environment created by the physical environment 20 and the augmented reality elements provided to the trainee through the binocular display 30 and the earphones 32 of the headset 27.

As shown in the Venn diagram of FIG. 5, the processing, record-keeping, and interactivity functions of the augmented reality system 18 are split between the onboard processor 36 and the server 19. Ideally all the immediate functionality, e.g., audio and visual outputs of the augmented reality system 18, is supplied by the onboard processor 36, with the server providing additional processing tasks such as command generation, event recognition, e.g., weapon hit recognition, and intra-trainee communication, and external command communications. Certain processing tasks shown in the overlapping portion of the Venn diagram circles are tasks which may be shared between, or performed by either the onboard processor 36 and the server 19, particularly: augmented reality (AR) provided audio video (POV) alignment, augmented reality audio video input/output and scope augmented reality audio video (AV) input and output.

As the trainee 24 moves physically through the environment 20 and along the scenario time or events line, the trainee experiences being in an augmented reality, perceiving, as shown in FIG. 3F, both the physical environment 20 and the videogame imagery. Through the augmented reality, the trainee experiences realistic scenario events in a realistic environment like that of a Hogan's Alley. This experience of the trainee combines realism with cost-effective, flexible, and a more dynamic environment than is available in a Hogan's Alley staging. The augmented reality system 18 provides a high-level functionality, reality, dynamic and reactive environment, together with cost and time effective, and flexible mission design, post-mission scoring, replay, and metric generation, and has a relatively low cost.

The data flow necessary to the augmented reality system 18 is illustrated in FIG. 7 where the processing and data flows of the two major active systems, the headset 27 (plus the weapon 42), and the sever 19 onboard processor 36 components, are shown. The headset 27 outputs left 62 and right 64 video from the binocular cameras 28. The tracking videos 68, 69 corresponding to the tracking cameras 25 shown in FIG. 4 are used to determine the orientation of the trainee 24. The weapon 42, which can be viewed as a subsystem of the headset 27, provides user controlled outputs like a game controller, providing outputs including trigger out, menu selection, and calibration buttons. To attain greatest functionality, computational functions 70 are broken down between the onboard processor 36 which provides minimal latency and continuity in the event of communication link dropout, and the server 19 which provides a video game engine which generates the game environment from which the left and right augmented reality video outputs 74 are produced. The server 19 also provides audio input 71 which is supplied to the trainee's stereo earphones. The server also detects the laser 58 impact point within the physical environment 20 by use of brightness or a band pass filter centered on the laser wavelength. The server 19 maintains the CAD model of the physical environment 20 to which is mapped the trainee's location and the laser 58 impact point, as well the physical structures 47 to which the video game augmented reality video imagery is applied through the traveling matte software in the onboard processor 36.

The entire CAD model with video game imagery applied is exported to the onboard processor 36. The onboard processor 36 aligns the video out 62, 64 to the CAD model to which game imagery is applied. Software running within the onboard processor 36 takes the video output 62,64 of the binocular cameras 28 and using the traveling matte 31 composites the video output with the videogame imagery 72 downloaded to the onboard processor 36 so that the videogame imagery appears on the physical structures 47 which are displayed to the trainee 24 through the binocular display 30.

Known virtual reality head-mounted display systems such as the Oculus Rift "Crystal Cove" prototype released in early 2014 provides virtual reality for a generally seated game player utilizing both inertial and position tracking via an external camera which tracks IRLEDs on the headset. In contrast, the headset 27 of the invention combines real imagery with augmented reality computer game imagery and provides accurate positional tracking over the entire physical environment 20 with sufficient accuracy to provide augmented reality throughout the physical environment, so that a Hogan's Alley type scenario simulation can be conducted. In known video combat game systems, training exercises are conducted through a video gaming interface, or in a physical environment such as a Hogan's Alley, or in a environment which combines video screens in a physical environment. Known augmented reality systems are generally similar to Google Glass which simply superimposes video imagery on a real scene. In the augmented reality system 18 of this invention the physical environment 20 is seamlessly combined with video images output by the game engine by the use of a traveling matte which identifies portions of the visible physical environment and replaces them with the video images output by the game engine. Additionally, peripheral vision is preserved either by providing complete binocular display up to the limits of peripheral vision, or by providing a visual path to the peripheral vision which is matched in luminance to higher resolution augmented reality images provided by the binocular displays 30.

Display brightness of the binocular display, and the brightness of objects within the display, are adjusted to match the display of the composited video game imagery (or the video game imagery is adjusted) to the physical environment. Preferably, foreground imagery such as the arms, hands, legs and feet of the trainee are processed, such as by adjusting absolute luminance of these objects from the video out feed 62, 64, so that the composited videogame imagery matches the brightness of the physical environment with the trainee's arms 46, legs 48 and weapon 42. Everything visible to the trainee is matched to the ambient light so that a dark room appears dark and the trainee or other objects are not disproportionately lit when compared to ambient illumination. If a clear visual path to peripheral vision is provided, the brightness of the peripheral vision is adjusted electronically by dimmable smart glass.

It should be understood that light amplifying night vision goggles can also be simulated by applying the single chromatic illumination provided by night vision goggles to the video feed 74 provided to the binocular display 30.

It should be understood that real-time is defined to mean within the time frame indistinguishable by the user from instantaneous which generally means the data or images are provided within a few (3-7) milliseconds of the actual time during which the images are recorded for the events taking place, in all cases preferably less than 20 ms. Near real-time is defined as 20 ms to 90 ms and can be used for lower fidelity systems such as for a walk though the training simulation designed to familiarize a trainee with a particular physical location, for example, an aircraft, ship, or submarine.

It should be understood that video game imagery means a static or a dynamic computer generated graphic, for example computer generated graphics produced by a game engine i.e., a program that generates a virtual visual environment which can be viewed from a moving point of view.

A traveling matte is a mask used to determine the portions of the video feed from the binocular cameras 28 which are to be removed and replaced by video images, such as provided by a game engine providing video game imagery mapped to the CAD model of the physical environment, which is composited with the images of the physical environment. The traveling matte identifies within the headset video feed 62, 64, on a pixel by pixel basis, what in the images is to be replaced by the videogame imagery. The traveling matte is formed by those portions of the physical environment determined as illustrated and described with respect to FIGS. 3A-F3 or as marked with visual signatures, e.g., chroma keying, which are present in the binocular video feed (i.e., not blocked from the view of the binocular cameras 28 by the trainee(s) or the viewing angle), such that the source of video game imagery corresponding to the traveling matte is composited with portions of the binocular video feed from which the traveling matte has been subtracted.

A compositor is defined as a processor such as the onboard processor 36 or the server 19 running a video compositing software connected to the binocular video feed 62, 64 of the physical environment, and connected to the source of video game imagery mapped to the physical environment, the compositor forming the source of composited video, wherein the supply of binocular video feed of the physical environment is combined through a traveling matte formed by those portions of the physical environment marked or identified as described with respect to FIGS. 3A-3F or by visual signatures which are present in the binocular video feed, such that the source of video game imagery corresponding to the traveling matte is composited with portions of the binocular video feed 62, 64 not corresponding to the traveling matte.

One implementation of a compositor uses OpenSceneGraph Open Source graphics Library which in turn calls OpenGL Library functions to achieve alpha blending. Background image (B) (image from cameras 28) is rendered first. The 3D model (i.e., the CAD model) is rendered second with glBlendFunc (GL_SRC_ALPHA, GL_ONE_MINUS_SRC_ALPHA) function that changes the overall transparency of all the virtual objects in the scene. The semi-transparent rendering is then directly blended with the background image which is opaque. The alpha value (0-1) is used to adjust the overall transparency of the virtual model.

In another implementation of a compositor the virtual model (i.e., the CAD model) is rendered into a texture (V). Then the background image (B) (image from cameras 28) and the virtual model rendering (V) are blended based on a blending mask that contains relative blending (Alpha) values for every pixel. The following equation is applied to every pixel: Result Image=Alpha*B+(1-Alpha)*V. The mask can be dynamic, based on the external tracking system, chroma key information, or a simple geometric blending pattern (alpha=1 and the bottom of the screen and progressively becomes Alpha=0 closer to the middle of the image (going vertically), and then Alpha=0 for the top half of the image).

The CAD model can be updated (improved) by walking through the physical environment 20 when it is empty and recording with the binocular cameras 28 the appearance of the physical environment under a particular lighting arrangement and with any modifications which have been made to its appearance, together with recording the corresponding position of the headset determined with the tracking camera(s) 25 or by other tracking techniques. Following the recorded walk-through, the CAD model is augmented or modified based on the images from the binocular cameras to better correspond to the actual appearance of the physical environment 20 as it appears under the particular lighting arrangements, and any changes that have been made to the physical environment since the original construction of the CAD model. The augmentation or modification of the CAD model may be by the simple expedient of changing the appearance of the model to the appearance of the empty physical environment 20 as it appears during the walk-through, e.g., by adjusting or writing to the CAD model surfaces the recorded image density, recorded during the walk-through. In this way the CAD model as augmented or modified when compared-to/subtracted-from the binocular video feed from the cameras 28 during a training exercise will produce a better image from which the traveling matte is constructed. This technique of conducting a recorded walk-through of the entire physical environment thus has the effect which could be achieved by manually adjusting the lighting and augmenting/modifying the CAD model, at lower cost, and perhaps greater fidelity.

It should be understood that the video imagery applied to the CAD model is usually applied to surfaces within the CAD model which correspond to surfaces in the physical environment 20. However, it is also possible to add a virtual surface to which video imagery may be applied. Such virtual surfaces have the disadvantage that they place virtual images which do not correspond to structures in the physical environment, however they can be useful for displaying floating signboards, which, for example, present diagrams or instructions to the trainees, or to generally provide virtual images in locations where the trainee is not likely to attempt to physically engage the virtual surfaces.

It should be understood that the augmented reality simulator can be used to train for any activity, particularly ones involving danger to the trainee such as police and fire fighting training. Where real training involves high cost such as in simulators for airplanes submarines or ships, a conventional simulator can be replaced with simulators which do not have active control screens of switches, but only the physical sets with parts e.g., switches, that move but are not connected to display simulators, and where motion is registered by an appearance change e.g., a color, position or a light activation locally on a part or switch. The augmented reality headset 27 and software can provide some or all of the visual and audio responsiveness of the simulator.

It should be understood that the augmented virtual reality of this invention does not require motion capture technology because the trainees present in the physical environment are imaged by the binocular cameras 28 on the headset 27 along with the physical environment. Furthermore, because the virtual images are composited with the aid of a traveling matte, real objects—even vehicles—can be placed in the physical environment and will appear in the augmented virtual reality. This type of virtual reality also facilitates real walls, structures, and stairs which are actually imaged and composited with a traveling matte with virtual augmentation. In this arrangement, portions of the structures in the physical environment remain visible, hence, when the trainee reaches out to a doorframe it is physically there.

It should be understood that any technique of tracking the position of the headset 27 with sufficient accuracy so that the output of the binocular cameras 28 can be accurately aligned with the CAD model of the physical environment 20 now known or developed in the future could be used in addition to those described herein.

It should be understood that the game engine will typically employ a CAD model as part of the game engine which generates video game imagery, so the game engine CAD model may be one and the same as the CAD model used to create the traveling matte, and so the processor hosting the CAD model can be part of the game engine.

The physical environment 20 is defined as a structure making up the arena, stage or natural setting in which a training exercise is conducted and includes the people, and equipment which are part of the training exercise.

The videogame engine, or videogame imagery comprises a computer program which generates images which may be displayed on the binocular display 20, or any digital or video display, the images are normally in the form of a computer model of the virtual world, which may be static or dynamic and which may change as a virtual viewpoint is changed.

Although images of the physical environment and the video game images may overlap, it is preferable if there is substantially no overlay overlap such that the trainee is not distracted or confused by the overlapping images i.e. without substantial overlap means no or only a few pixels along the border between the videogame imagery and the images from the binocular display cameras 28, such as may be caused for example by latency issues in the various video feeds, or rapid motion of the trainee or objects within the physical environment.

It should be understood that the augmented reality simulator could be used for entertainment purposes, such as in a paintball game or a virtual tour.

It is understood that the invention is not limited to the particular construction and arrangement of parts herein illustrated and described, but embraces all such modified forms thereof as come within the scope of the following claims.

We claim:

1. A method of conducting a real-time augmented reality training session for a trainee, comprising the steps of:
   mounting a headset to a trainee's head;
   having the trainee enter a physical environment;
   producing a first source of binocular video feed of the physical environment, corresponding at least partially to a normal visual field of the trainee from binocular cameras mounted to the headset; and
   displaying on a binocular display mounted to the headset a second source of binocular video feed to provide binocular imagery to a trainee;
   wherein the second source of binocular video feed is generated by compositing the first source of binocular video feed of the physical environment with a third source of binocular video feed comprising video game imagery which replaces portions of the first binocular video feed;
   wherein the portions of the first binocular video feed replaced are identified by a signal in the first binocular video feed or by using machine vision comparisons of the first source of binocular video feed to the third source of binocular video feed, so that the video game imagery and parts of the physical environment are displayed to the trainee on the binocular display without substantial overlap;
   generating a fourth source of binocular video feed of a traveling matte by extracting portions of the first binocular video feed; and
   subtracting the fourth source of traveling matte binocular video feed from a fifth source of binocular video feed of video game imagery written on a model of the physical environment to form the third source of binocular video feed;
   tracking the position of the headset with at least one camera mounted to the headset by imaging indicia written on the physical environment and visible to the at least one tracking camera;
   creating a CAD model of the physical environment and aligning the CAD model with a tracked position of the headset;
   producing a sixth source of video feed of the CAD model from a view of the model corresponding to the first source of binocular video feed of the physical environment;
   creating video game imagery and writing the video game imagery to selected portions of the CAD model of the physical environment and creating the fifth source of binocular video feed corresponding to the view of the model corresponding to the first source of binocular video feed of the physical environment and having the video game imagery written thereon; and
   wherein the fourth source of traveling matte binocular video is created by comparing the first source of binocular video feed of the physical environment to the sixth source of video feed view of the CAD model to generate the traveling matte from portions of the physical environment which lack correspondence to the CAD model.

2. The method of claim 1 wherein the fourth source of traveling matte binocular video is created by comparing the first source of binocular video feed to the sixth source of binocular video feed CAD model by machine vision and drawing an outline of portions of the physical environment which lack correspondence to the CAD model and filling the outline.

3. The method of claim 1 further comprising the step of firing a laser beam from the gun carried by the trainee and locating a hit point for the laser beam in the physical environment by identifying light of the laser beam in the first source of binocular video feed.

4. The method of claim 1 further comprising the step of matching brightness of the first source of binocular video feed with the brightness of the third source of binocular video feed.

5. The method of claim 1 further comprising the step of generating a training scenario, and using the training scenario to determine the videogame imagery, and the selected portions of the CAD model on which the videogame imagery appears in the second video feed as displayed on the binocular display mounted to the headset.

6. The method of claim 5 wherein the generated training scenario includes a time or event line over which the videogame imagery changes.

\* \* \* \* \*